United States Patent [19]
Tsai

[11] Patent Number: 5,788,021
[45] Date of Patent: Aug. 4, 1998

[54] AUTOMATIC OUTPUTSHAFT LOCKING MECHANISM FOR ELECTRIC TOOLS

[76] Inventor: Feng Chun Tsai, No. 1, Alley 2, Lane 19, Shulin 8th St., Taoyuan, Taiwan

[21] Appl. No.: 867,248

[22] Filed: Jun. 5, 1997

[51] Int. Cl.⁶ .......................... B23B 31/171; B23B 31/22; B65H 59/10
[52] U.S. Cl. .......................... 188/67; 188/82.5; 188/82.84; 279/902; 279/904; 408/239 R; 408/240; 192/8 R
[58] Field of Search .......................... 188/67, 82.1, 82.5, 188/82.2, 82.8, 82.77, 82.84, 134, 69; 192/45, 8 R; 408/239 R, 239 A, 238; 279/904, 905, 72, 75, 81, 143, 144, 2.23, 902, 140, 151; 82/160

[56] References Cited

U.S. PATENT DOCUMENTS

| | | | |
|---|---|---|---|
| 3,640,092 | 2/1972 | Neal et al. | 188/134 |
| 4,122,755 | 10/1978 | Johnson et al. | 408/238 |
| 4,177,887 | 12/1979 | Kellett et al. | 188/82.84 |
| 4,981,057 | 1/1991 | Von Haas et al. | 82/160 |
| 5,016,501 | 5/1991 | Halzer, Jr. | |
| 5,417,527 | 5/1995 | Wienhold | 408/239 R |
| 5,496,139 | 3/1996 | Ghode et al. | 188/69 |
| 5,531,549 | 7/1996 | Fossella | 408/240 |
| 5,577,743 | 11/1996 | Kanaam et al. | 279/904 |
| 5,601,388 | 2/1997 | Lauterwald | 408/239 R |
| 5,624,013 | 4/1997 | Tsai | 188/82.2 |

*Primary Examiner*—Douglas C. Butler
*Attorney, Agent, or Firm*—Bacon & Thomas

[57] ABSTRACT

An automatic output shaft locking mechanism for electric tools, and particularly a locking mechanism in which the output shaft is driven by electric power and will automatically lock in position when it is turned by an external force, including a retaining end with three equi-angular projections at one end of the output shaft in the tool, and a rotary disk having three equi-angular notches at an outer side. The outer portion of the rotary disk is fitted with a securing ring, and its three notches receive lock rollers respectively. When the retaining end turns, the three projections will push the lock rollers to engage the securing ring so that the output shaft is locked in position.

1 Claim, 3 Drawing Sheets

AUTOMATIC OUTPUTSHAFT LOCKING MECHANISM FOR ELECTRIC TOOLS

BACKGROUND OF THE INVENTION (a) Field of the Invention

The present invention relates generally to an automatic output shaft locking mechanism for electric tools, and more particularly to a locking mechanism in which a securing ring, a rotary disk, a retaining end, and lock rollers are disposed between an input shaft and an output shaft such that the input shaft may freely drive the retaining end of the output shaft via the rotary disk while the output shaft will be locked in position due to engagement of the lock rollers with the securing ring when an external force is applied to turn the retaining end of the output shaft.

(b) Description of the Prior Art

The mechanism of the present invention may be applied to output shafts of screw drives, drill drives, and impact drills. The above-mentioned electric tools, particularly electric hand tools, may be coupled with drivers, spanners, wrenches, and the like. They are hand held when driving, drilling, striking, or grinding workpieces. These electric hand tools are generally driven by motors, and a driven component coupled to the front end of the hand tool is rotated so as to be able to work on a workpiece. Take the common electric hand drill as an example. After the drill is connected to electricity, the motor drives a rotary shaft to drive directly or via a speed change mechanism a driven component at the front end of the drill for drilling purposes. Since the electric hand drill is often provided with other functions by replacing the driven component at the front end. For instance, the drill bit may be replaced by a driver, a hexagonal wrench, or other drill bits, drivers or wrenches of different specifications. Since the rotary shaft may freely rotate, it poses an obstacle in replacing the driven components. Furthermore, if a screw bit is used to loosen a screw, although the tool has the function of reverse rotation, the tightly locked screw oftentimes cannot be loosened by rotating the screw bit reversely under the greatest static friction. If attempts are made to try to force out the screw, the head slot of the screw may be damaged so that it is no longer possible to drive out the screw.

In view of the above drawbacks with conventional hand tools, the inventor of the present invention aims to provide an output shaft that may be electrically driven by a motor and may remain stationary to facilitate replacement of driven components, or it may be operated by hand. The present invention is directed to an automatic locking mechanism to be disposed in the output shaft. The mechanism comprises a retaining end, a rotary disk, a securing ring, and a plurality of lock rollers. The output shaft may freely rotate when connected to electricity and may be locked in position by turned by an external force.

SUMMARY OF THE INVENTION

A primary object of the present invention is to provide a locking mechanism in an output shaft of an electric hand tool such that when a force is applied to turn the output shaft, the output shaft will be locked in position and cannot be rotated so as to facilitate replacement of drill chucks, drill bits, screw bits, and the like.

Another object of the present invention is to provide an electric driving tool in which a drive bit may be locked to serve as an ordinary screw driven when no electricity is available.

A further object of the present invention is to provide a driving tool in which a drive bit may be locked by applying an external force so as to provide the starting torque necessary for loosening a screw and hence facilitate loosening of screws.

BRIEF DESCRIPTION OF THE DRAWINGS

The present invention will now be described by way of example with reference to the accompanying drawings, in which.

DETAILED DESCRIPTION OF THE PREFERRED EMBODIMENT

Figure 1:
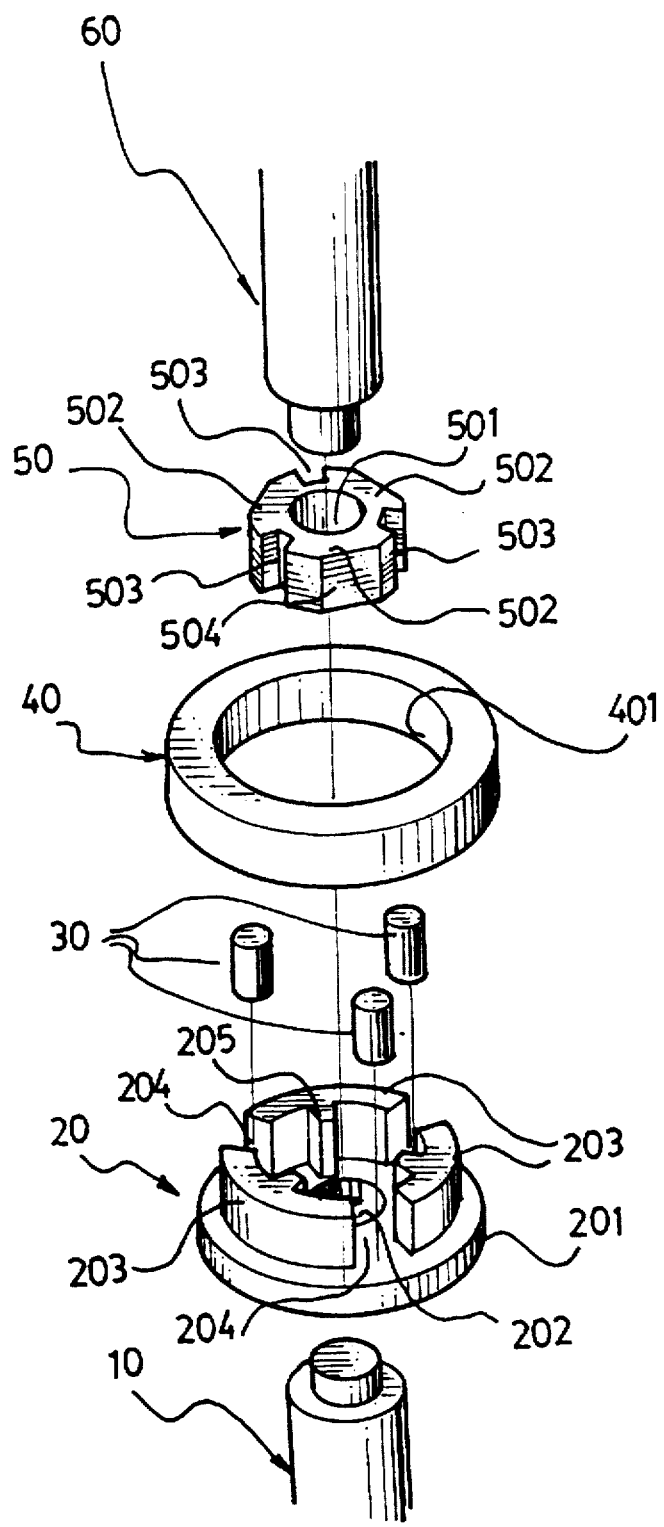
FIG. 1 is a perspective exploded view of the present invention.

With reference to FIG. 1, the automatic output shaft locking mechanism for electric tools is essentially comprised of a rotary disk 20, lock rollers 30, a securing ring 40, and an output shaft. The lock mechanism is disposed between an inner shaft 10 and an outer shaft 60 of the output shaft. A motor (not shown) for the electric tool and output shaft are provided for outputting torque. In the present invention, the output shaft is divided into the inner shaft 10 and the outer shaft 60. A rear end of the inner shaft 10 is coupled to the rotary disk 20. An outer periphery of the rotary disk 20 has the securing ring 40 fitted thereon. The securing ring 40 is secured at a certain position (not shown) in a housing of the electric tool, so that the rotary disk 20 may freely rotate on the securing ring 40. The end of the outer shaft 60 facing the rear end of the inner shaft 10 is coupled to a retaining end 50.

The rotary disk 20 is comprised of a circular base disk 201, which has a central through hole 202 for coupling with the inner shaft 10. Three equidistantly spaced curved plates 203 project from one side of the base disk 201 with a notch 204 defined between adjacent curved plates 203. A projecting block 205 projects from the middle of an inner wall of each curved plate 203. By means of this arrangement, an inner peripheral wall 401 of the securing ring 40 may fit around the curved plates 203 on the base disk 201 of the rotary disk 20. The retaining end 50 matches the structure of the rotary disk 20. It has a central through hole 501 for coupling with the outer shaft 60. Three equidistantly spaced projections 502 extend outwardly from the center of the outer peripheral wall of the through hole 501, with a notch 503 defined between adjacent projections 502. The outer surface of each projection 502 is milled to form a planar portion 504.

Figure 2:
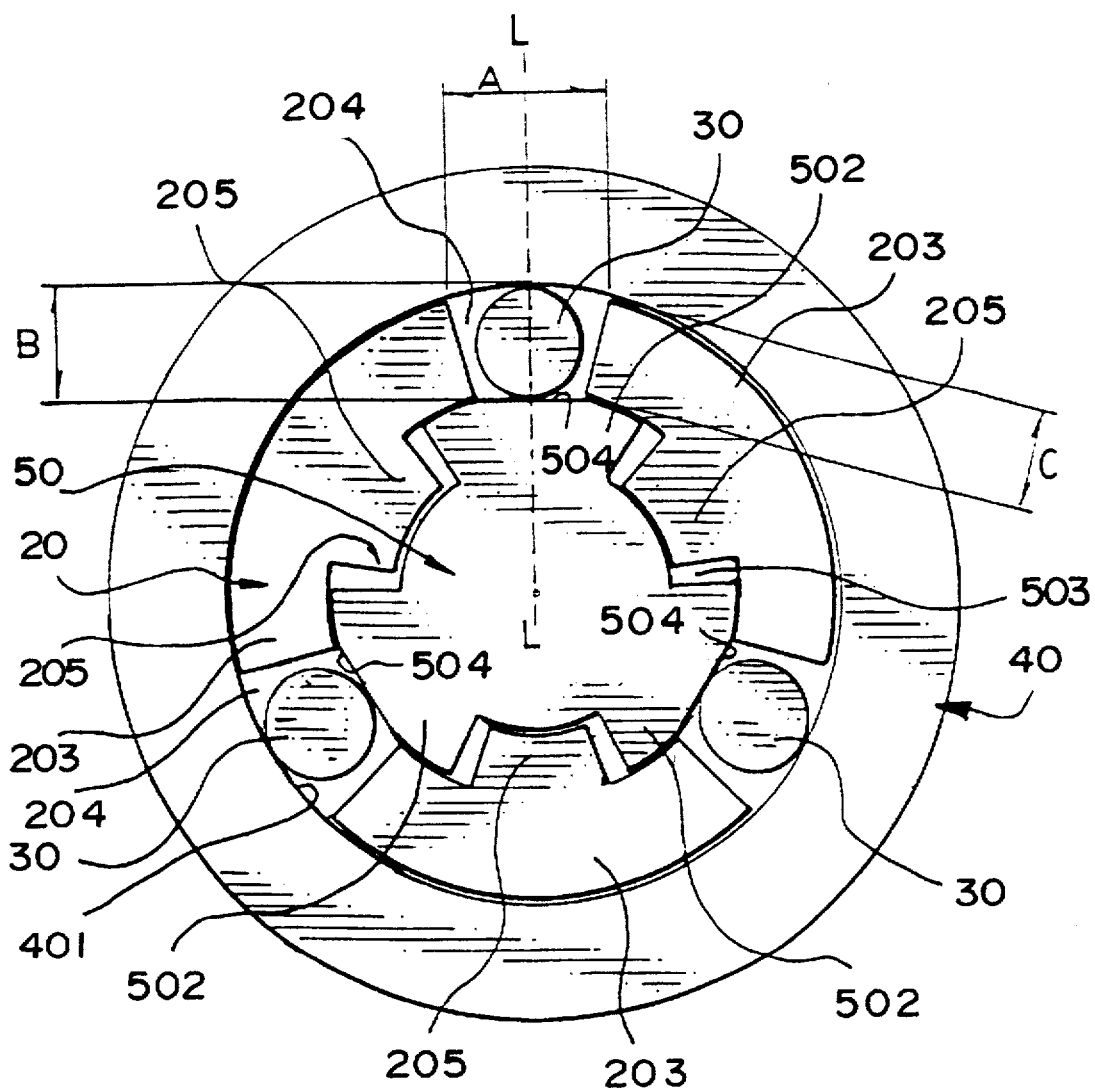
FIG. 2 is an assembled end view of the present invention.

With reference to FIG. 2, which shows assembly of the rotary disk 20, securing ring 40, and retaining end 50, the retaining ring 50 is inserted into the rotary disk 20, such that each projection 502 may just fit in between the two projecting blocks 205 of every two adjacent curved plates 203. In other words, the projecting blocks 25 of the rotary disk are inserted into the corresponding notches 503 of the retaining end 50, with the planar portions 504 of the projections 502 facing the corresponding notches 204 of the rotary disk 20. And in the three enclosed spaces defined by the notches 204 between adjacent curved plates 203, the inner peripheral wall 401 of the securing ring 40, and the planar portions 504 of the projections 502 are fitted respective lock rollers 30, which are short cylindrical structures.

With reference to FIG. 2, the distance between two projecting blocks 205 of the curved plates 203 is greater than the width of each projection 502, whereas the width of each notch 503 is greater than that of each projecting block 205. In this way, the retaining end 50 may rotate relative to the rotary disk 20 about a certain angle. The length A of the notch 204 between two adjacent curved plates 203 must be greater than the diameter of the lock rollers 30 by a certain extent. Furthermore, using an imaginary line L passing through the common center of the circles, the greatest width B of the notch 204 is slightly greater than or equal to the diameter of the lock rollers 30. In other words, the lock rollers 30 may freely rotate certain areas encompassed by the imaginary line L. Furthermore, the least width C of the notch 204 near the curved plates 203 at both sides is equal to or slightly smaller than the diameter of the rollers 30.

Figures 3, 4:
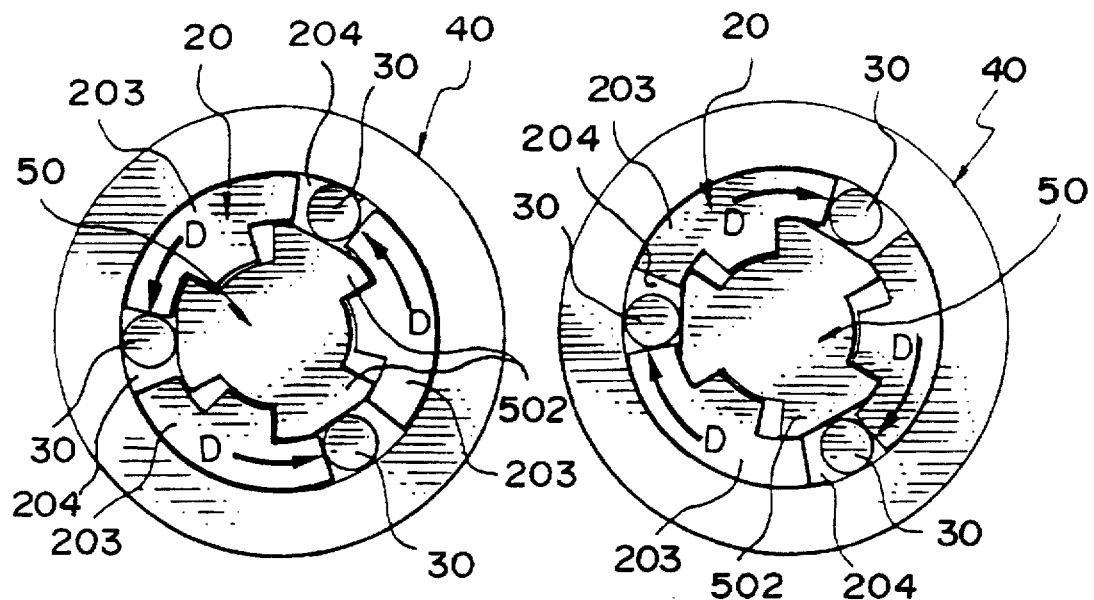
FIG. 3 is an end view showing a rotary disk of the invention driven by a force to turn in a counterclockwise direction.
FIG. 4 is an end view showing the rotary disk of the invention driven by a force to turn in a clockwise direction.
Figures 5, 6:
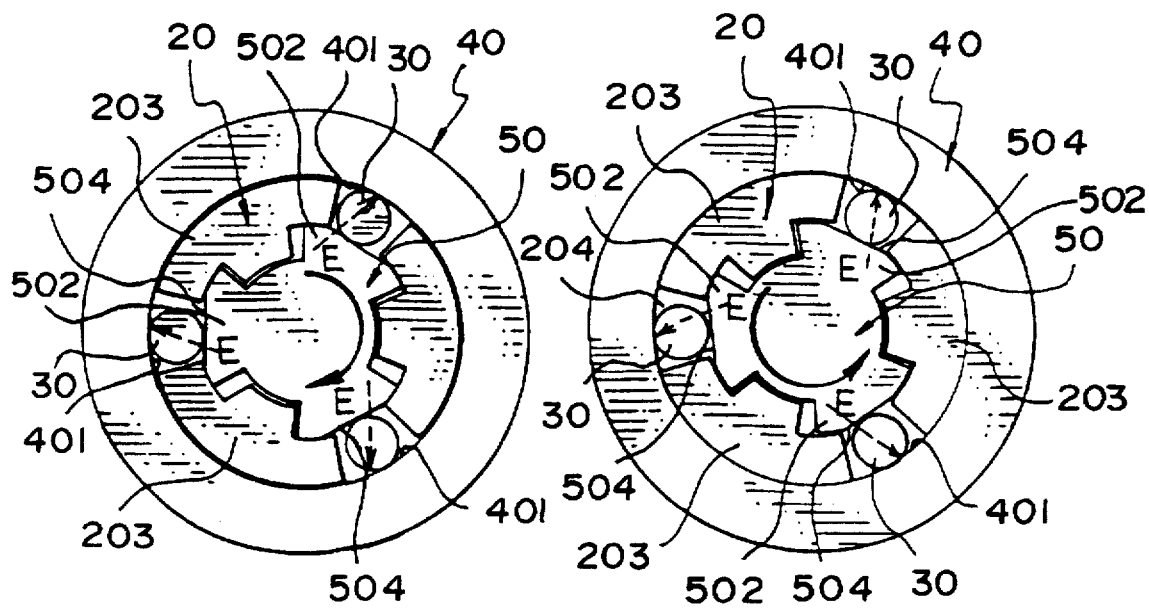
FIG. 5 is an end view showing a retaining end of the invention driven by a force to turn in a clockwise direction.
FIG. 6 is an end view showing the retaining end of the invention driven by a force to turn in a counterclockwise direction.

The rotational effects generated by the invention thus assembled based on the above conditions are shown in FIGS. 3, 4, 5 and 6. In FIGS. 3 and 4, the turning force is applied to the inner shaft 10, i.e., the rotary disk 20. In this mode of rotation, be it clockwise or counter-clockwise, the lateral end surfaces of the curved plates 203 will push the rollers 30 to roll along the inner peripheral wall 401 of the securing ring 40, thus turning the retaining end 50 engaged therein. From the above, it can be seen that when force is applied to the inner shaft 10, the outer shaft 60 may be smoothly brought to rotate. Referring to FIGS. 5 and 6, when the turning force is applied to the retaining end 50, by means of a clearance between the retaining end 50 and the rotary disk 20, the retaining end 50 will generate partial angle displacement according to the direction of force in the rotary disk 20, so that the planar portions 504 will alter the width B of the notches 204 due to angle change. As a result, the planar portions 504 directly urge against the lock rollers 30, which in turn urge against the inner peripheral wall 401 of the securing ring 40, so that the planar portions 504 of the retaining end 50 to the lock rollers 30 and the inner peripheral wall 401 of the securing ring 40 are locked. Therefore, whether the retaining end 50 is turned clockwisely or counter-clockwisely, it will be locked after turning through a small angle.

The technical principle is that the lock rollers 30 are pushed in opposite directions. If the rotary disk 20 is turned, the lateral ends of the curved plates 203 push the lock rollers 30 along the curve D (see FIGS. 3 and 4) so that the lock rollers 30 may smoothly rotate in the securing ring 40. Conversely, when the retaining end 50 is turned, the lock rollers 30 are pushed to deviate from the circumference, and the planar portions 503 of the retaining end 50 will then push against the lock rollers along the tangential direction E (see FIGS. 5 and 6), so that the retaining end 50 is locked in position.

In view of the above, it can be understood that the present invention has the following advantages:

1. Chucks and drill bits or screw bits may be speedily and conveniently removed or replaced.
2. The locking mechanism of the invention may be used as an ordinary screwdriver when there is no electric power supply.
3. The present invention provides the initial torque when loosening screws manually so as to faciliate removal of screws.

In summary, the present invention is novel in structure, easy to use, and provides excellent effects.

It is understood that the drawings are designed for purposes of illustration only, and are not intended as a definition of the limits and scope of the invention disclosed.

What is claimed is:

1. An automatic output shaft locking mechanism for electric tools, comprising an output shaft, a rotary disk, a plurality of lock rollers, and a securing ring, wherein said output shaft is divided into an inner shaft and an outer shaft, a rear end of said inner shaft being coupled to said rotary disk, which has an outer periphery fitted with said securing ring, said securing ring being secured at a certain position in a housing of the electric tool, so that said rotary disk may freely rotate on said securing ring, that end of said outer shaft facing the rear end of said inner shaft being coupled to a retaining end;

said rotary disk is comprised of a circular base disk, which has a central through hole for coupling with said inner shaft, three equidistantly spaced curved plates projecting from one side of said base disk with a notch defined between adjacent curved plates, a projecting block projecting from the middle of an inner wall of each curved plate, whereby an inner peripheral wall of said securing ring may fit around said curved plates on said base disk of said rotary disk;

said retaining end matches the structure of said rotary disk and has a central through hole for coupling with said outer shaft, three equidistantly spaced projections extending outwardly from the center of the outer peripheral wall of said through hole, with a notch defined between adjacent projections, the outer surface of each projection being milled to form a planar portion; and said retaining ring is inserted into said rotary disk such that each projection on said retaining end may just fit in between the two projecting blocks of every two adjacent curved plates, and said projecting blocks of said rotary disk are inserted into the corresponding notches of said retaining end, with said planar portions of said projections of said retaining end facing the corresponding notches of said rotary disk, and respective lock rollers in the form of short cylindrical posts being inserted in the three enclosed spaces defined by said notches between adjacent curved plates, said inner peripheral wall of said securing ring, and said planar portions of said projections; wherein the distance between two projecting blocks of said curved plates is greater than the width of each projection of said retaining end, whereas the width of each notch of said retaining end is greater than that of each projecting block, so that said retaining end may rotate relative to said rotary disk about a certain angle; the length of said notch between two adjacent curved plates must be greater than the diameter of said lock rollers by a certain extent such that the greatest width of said notch is slightly greater than or equal to the diameter of said lock rollers with respect to an imaginary line through the centers of the circles, and said lock rollers may freely rotate within a certain range of the imaginary line; and the least width of said notch near said curved plates at both sides is equal to or slightly smaller than the diameter of said rollers; whereby when a turning force is applied to said inner shaft and hence said rotary disk, be it clockwise or counter-clockwise, the lateral end surfaces of said curved plates will push said rollers to roll along said inner peripheral wall of said securing ring, thus turning said retaining end engaged therein, and rotating said outer shaft; when the turning force is applied to said retaining end, by means of a clearance between said retaining end and said rotary disk, said retaining end will generate partial angle displacement according to the direction of force in said rotary disk, so that said planar portions will alter the width of said notches due to angle change, resulting in that said planar portions directly urge against said lock rollers, which in turn urge against said inner peripheral wall of said securing ring, so that said planar portions of said retaining end to said lock rollers and said inner peripheral wall of said securing ring are locked, and hence whether said retaining end is turned clockwisely or counter-clockwisely it will be locked after turning through a small angle.

* * * * *